Jan. 8, 1935.　　　　　L. T. FREDERICK　　　　1,987,556
MICA LAYING MACHINE
Filed Oct. 3, 1932　　　2 Sheets-Sheet 1

Jan. 8, 1935.  L. T. FREDERICK  1,987,556
MICA LAYING MACHINE
Filed Oct. 3, 1932   2 Sheets-Sheet 2

Inventor
Louis T. Frederick
by his Attorneys
Howson & Howson

Patented Jan. 8, 1935

1,987,556

UNITED STATES PATENT OFFICE 1,987,556

MICA LAYING MACHINE

Louis T. Frederick, Valparaiso, Ind., assignor to Continental-Diamond Fibre Company, Newark, Del., a corporation of Delaware Application October 3, 1932, Serial No. 636,045

3 Claims. (Cl. 154—2.5)

This invention relates to machines for producing sheet mica or mica-plate from which mica rings, disks, segments and the like are manufactured. Sheet mica is well known commercially and consists of mica flakes or laminations superposed upon each other in overlapping relation and bonded together by shellac, Manila gum, synthetic resin or other adhesive. Sheet mica has heretofore been made by depositing the mica and the bonding material in solution on a traveling bed member which carries the composite material through successive stages of operation. Such a method and apparatus therefor is disclosed in my prior Patent No. 1,760,233, dated May 27, 1930.

Heretofore no commercial method has been developed which produces sheet mica continuously by the use of a dry bonding material, such as powdered shellac. One object of the present invention is to provide a method and means for producing such a sheet.

Another object of the present invention is to provide an improved machine of the general class above mentioned which is capable of producing an improved product, particularly with reference to uniform distribution of the mica flakes and the bonding material.

Another object of the invention is to provide a machine of this character which is capable of producing an improved product more economically than has heretofore been possible.

A further and more specific object of the invention is to provide an improved feeding and mixing mechanism in a machine of this class which functions to mix evenly the mica and the bonding material, such as shellac, and to feed the homogeneous mixture onto the traveling bed member.

Figure 2:
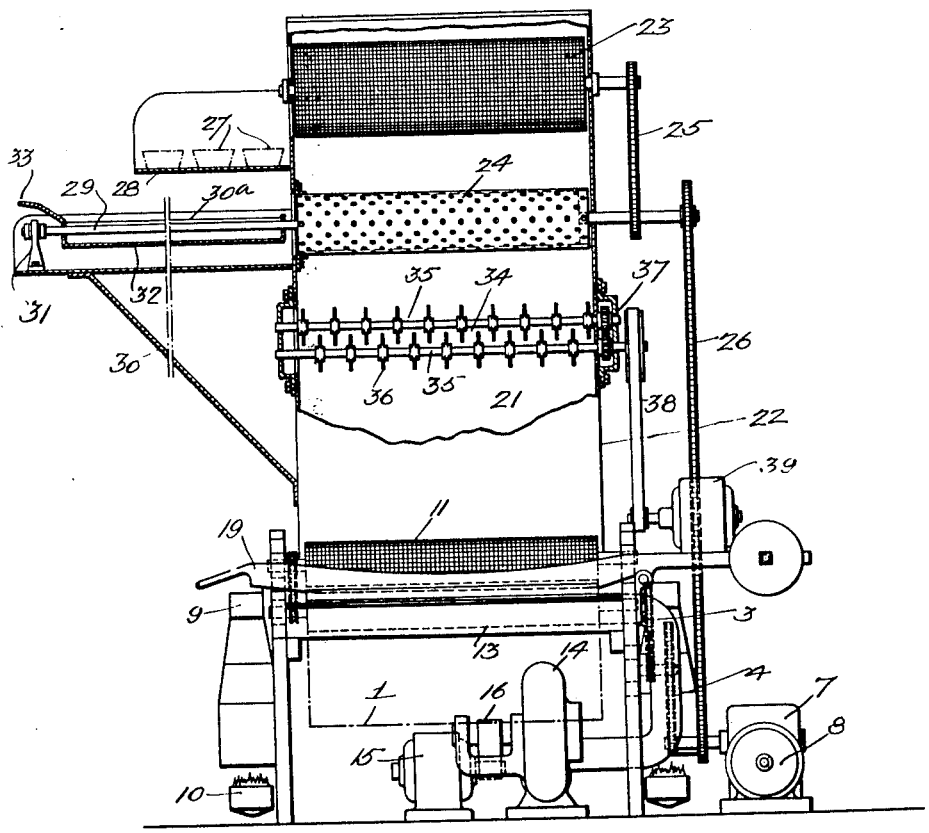
Figure 3:
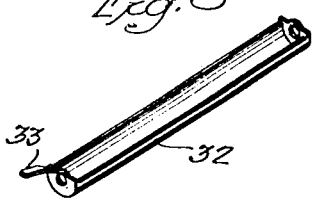

Other objects will be apparent hereinafter. A preferred form of apparatus constructed in accordance with the invention is illustrated on the drawings, wherein Fig. 1 is a side elevational view of a machine incorporating the teachings of the invention;

Fig. 2 is an end elevational view of the machine showing certain parts in section to more clearly illustrate the invention; and Fig. 3 is a detail perspective view of the half tube injector for depositing the bonding material in the machine.

Figure 1:
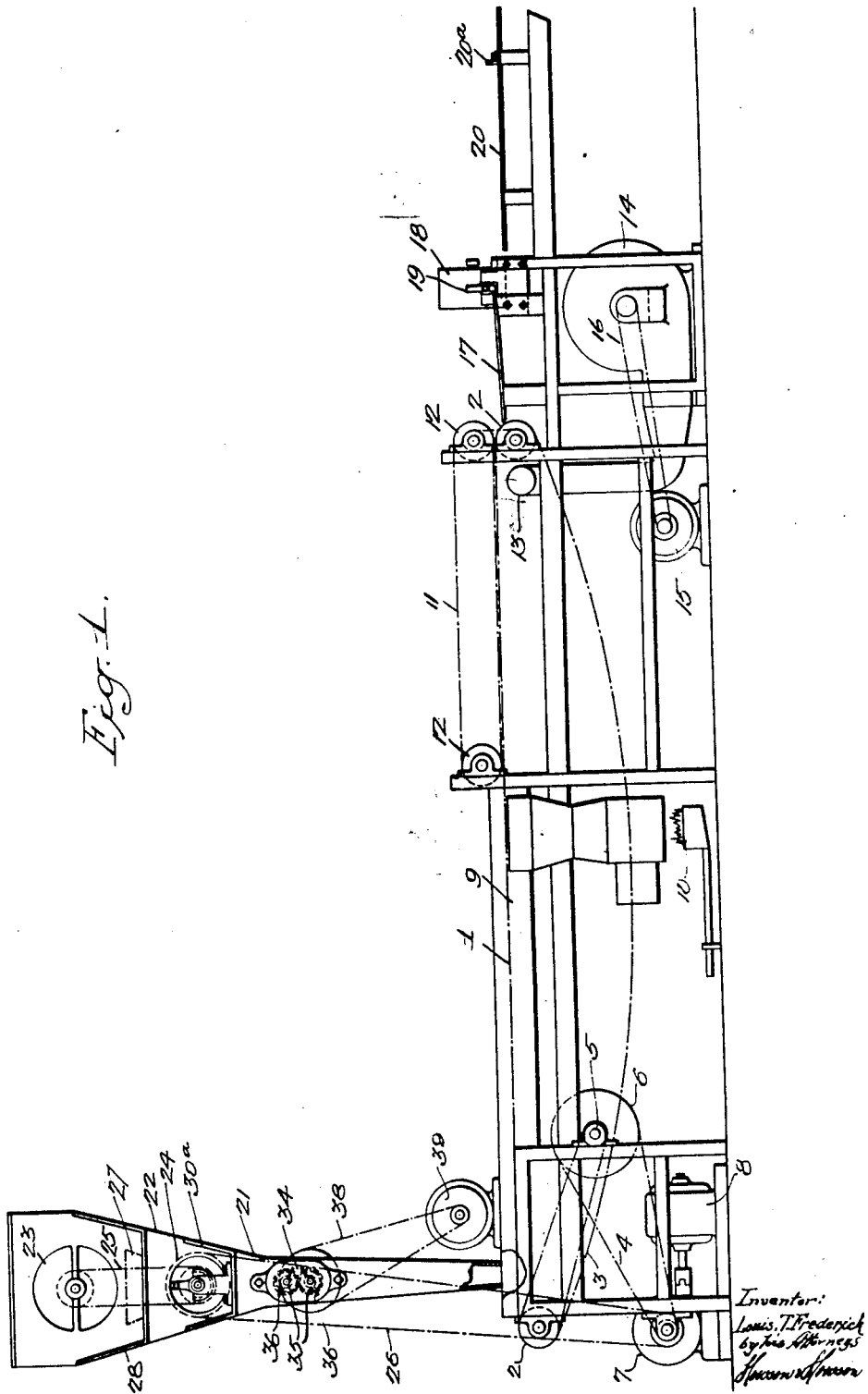

Referring particularly to Figs. 1 and 2, there is illustrated a machine of the same general class as is disclosed and claimed in my above-mentioned patent. This machine comprises a continuous traveling bed member 1 which preferably takes the form of a reticulated or screen member. This bed member passes between supporting and drive rollers 2 which are driven through the medium of flexible drive members 3 and 4, their respective pulley wheels 5 and 6, and gear reduction unit 7 by a suitable electric motor 8. A heating oven 9 is arranged in cooperative relation with the bed member so as to supply heat to a substantial portion of the bed member throughout the entire width thereof. The oven is supplied with heat by a suitable heater 10.

A second smaller continuous screen member 11 is disposed above a portion of bed member 1 and arranged to move between supporting rollers 12. Adjacent the outlet end of the disposed traveling screen members, there is provided a cooler 13 which is arranged to cool a substantial area of the screens throughout their entire width. This cooler may comprise a blower 14 which is driven by electric motor 15 through the medium of flexible drive member 16. A supporting platform 17 is disposed immediately adjacent the outlet end of the moving screens and a cutting device 18, which comprises a manually operable knife 19, is disposed at the end of the supporting platform. A second supporting platform 20 is positioned adjacent the cutting device and is provided with a stop 20a.

As is clearly set forth in my above-mentioned prior patent, in a machine of this character, the mica is placed in flake form upon the bed member 1 in any suitable manner. The bonding material in solution is allowed to flow or drip onto the mica flakes as they travel forward on the bed member. Shellac or Manila gum in an aqueous ammoniacal solution or in alcohol or a synthetic resin, such as a polybasic acid, polyhydric alcohol resin in alcohol is employed extensively. These associated materials are carried by the bed member through or past the heating device or oven which functions to evaporate the solvent and fuse or melt the bonding material and cause uniform distribution thereof throughout the mica flakes. The mixed materials now pass between the superposed screens and the upper screen member 11 cooperates with the bed member 1 to form and compress the material into a compact sheet. If it were not for the cooling means provided, the hot sheet would stick to the screen members. The cooling means, however, functions sufficiently to cool the sheet to separate it from the screens, whereupon it emerges from between the screens onto platforms 17 and 18. The cutting device is operated to cut the desired lengths of the continuous or long sheet, stop 20a serving as a measuring gauge.

In accordance with the present invention, there is provided a novel feeding and mixing mechanism designated generally by reference character 21 by which it is possible to employ a dry bond such as powdered shellac, powdered Manila gum or powdered synthetic resin or a mixture of said compounds. The invention will hereinafter be described, using shellac as a typical binder, but it is to be understood that other mica binders may be employed in the same manner as shellac. This mechanism comprises a tower or hopper 22 having a funnel-like shape and arranged to feed material placed therein onto bed member 1. As shown more clearly in Fig. 2, there is arranged transversely of the tower a reticulated rotatable drum 23 which is adapted to receive and sift the mica flakes. There is also provided below drum 23 a second reticulated drum 24 which is adapted to receive the powdered shellac. Preferably drum 23 takes the form of a cylindrical screen, while drum 24 takes the form of a perforated cylinder. The rotatable shafts of these drums are interconnected by means of flexible drive member 25 and are driven through the medium of flexible drive member 26 and gear reduction unit 7 by motor 8.

In order that the two superposed drums may be readily supplied with the materials above mentioned, one end of each of these drums is open or provided with a suitable opening allowing access to the interior of the drums. Since powdered mica will readily distribute itself throughout drum 23 even though deposited therein in concentrated or bulk form, the mica may be thrown into the drum in successive weighed quantities from suitable receptacles 27. A stationary tray 28 may be provided to support several of these receptacles within easy access of an operator.

I have found that powdered shellac drops in straight lines and will not distribute itself as will the mica and it is, therefore, unsatisfactory to deposit merely a bulk of shellac in drum 24. In order to supply the successive quantities of shellac to this drum and to obtain uniform distribution of the shellac therein, the shaft of the drum is extended at 29 exteriorly of the drum an amount which is at least as great as the length of the drum. A suitable bracket 30 may be attached to tower 22 and may support a tray 30a and a bearing 31 for the extended end of the drum shaft. A half-tube injector 32 (see Fig. 3) is loosely carried upon shaft 29 so that it may be manually rotated about. The injector is provided with an integral handle 33 by means of which it may be rotated from its normal upright position to an inverted position in order to dump its contents. The injector is of a length substantially equal to or slightly less than the length of drum 24. When the injector is slid along shaft 29 into drum 24, it is substantially co-extensive with the drum and its contents may be deposited uniformly in the drum by inverting it through the medium of its handle.

Below drum 24 and also extending transversely of the tower, there is provided a mixer 34 which may comprise parallel rotatable shafts 35 carrying mixing blades 36. These shafts are geared together, as at 37, and are driven through the medium of flexible drive member 38 by motor 39. The purpose of this mixer is to mix thoroughly and render homogeneous the mica and shellac falling from the rotatable drums through the tower.

In operating the device, successive weighed quantities of mica flakes are deposited at predetermined intervals of time in drum 23. The rotating drum filters the mica uniformly and allows it to drop through the tower. Successive measured quantities of powdered shellac are also placed in drum 24 at predetermined time intervals by means of the injector in the manner above explained. In order to insure that the shellac will flow uniformly from drum 24, I prefer to place small metallic bolts or washers loosely within the drum to keep the shellac from matting or clogging the perforations thereof. The rotating drum 24 filters the powdered shellac which has been spread uniformly therethrough. The falling mixture of shellac and mica is thoroughly mixed by the mixer and drops in layer form upon bed member 1, which carries it through the various operations mentioned above.

It may be desirable or necessary to treat the mica flakes prior to the time they reach the bed member with a wetting agent such as alcohol which will allow the shellac or other binder to bring about good adherence of the flakes. The wetting agent may be added at any suitable place while the mica flakes are falling in the hopper 22, but, in most instances, it will be found desirable to add the wetting agent to the mica before it comes in contact with the powdered shellac, for example in drum 23 or in the hopper between drums 23 and 24. The wetting agent, for example, may be sprayed into the hopper. In any event, I have found that when a wetting agent is used, less is required than is usually employed in the wetting of mica in the commercial practices heretofore used.

Although there is illustrated means for manually depositing in drums 23 and 24 predetermined quantities of mica flakes and powdered shellac at predetermined time intervals, it will be understood that provision may be made for automatic feeding of the drums. Also, the cutting device could be automatically operated so that the apparatus would be entirely automatic in operation.

The successive quantities of mica and shellac, as well as the successive time intervals, will depend in any instance upon the mica-plate or sheet which it is desired to produce. As a particular instance in which it is desired to produce what is known as 20% bond plate, the total weight of which is fifteen ounces for a 36 x 36 inch sheet, I insert twelve ounces of mica and three ounces of shellac every minute with the machine geared to produce sixty yards per hour.

Possibly the most important advantage of the invention is that it enables the use of a dry bond and the proper mixing of the exact quantities of mica and dry bonding material per unit time to give a satisfactory dry bond continuous mica sheet. The use of the dry bond eliminates the step of dissolving the binder in a suitable solvent and the difficulty encountered in freeing the composite plate of solvent. Thus economies are effected not only in the manufacturing steps but also in the cost of materials employed. Another very important feature of the device resides in the fact that it enables more even distribution of the mica and shellac than has heretofore been possible, thus resulting in a greatly improved product.

Although there is disclosed herein a single preferred embodiment of the invention, it will be understood that various changes and modifications may be made without departing from the invention.

I claim:

1. In a machine for producing a continuous mica sheet of uniform thickness and density, an endless bed member, means for moving said bed member at a predetermined speed, a tower operatively associated with said bed member, means within said tower for continuously and uniformly showering mica flakes in predetermined quantity per unit time onto said bed member, and means whereby dry bond material may be continuously introduced to said tower in predetermined quantity per unit time and evenly distributed transversely of said tower, whereby continuous and uniform intermingling of said dry bond material with said mica flakes is obtained, said last means comprising a perforate rotatable container extending transversely of the tower, and means movable into and out of said container during rotation thereof for introducing thereto predetermined quantities of said material per unit time and for evenly distributing the material through the tower.

2. In a machine for producing a continuous mica sheet of uniform thickness and density, an endless bed member, means for moving said bed member at a predetermined speed, a tower operatively associated with said bed member, means within said tower for continuously and uniformly showering mica flakes in predetermined quantity per unit time onto said bed member, and means whereby dry bond material may be continuously introduced to said tower in predetermined quantity per unit time and evenly distributed transversely of said tower, whereby continuous and uniform intermingling of said dry bond material with said mica flakes is obtained, said last means comprising an open end perforate rotatable drum extending transversely of said tower substantially the width thereof, and an injector of length comparable to the length of said drum arranged to slide into and out of said drum during rotation thereof.

3. In a machine for producing a continuous mica sheet of uniform thickness and density, an endless bed member, means for moving said bed member at a predetermined speed, a tower operatively associated with said bed member, means within said tower for continuously and uniformly showering mica flakes in predetermined quantity per unit time onto said bed member, and means whereby dry bond material may be continuously introduced to said tower in predetermined quantity per unit time and evenly distributed transversely of said tower, whereby continuous and uniform intermingling of said dry bond material with said mica flakes is obtained, said last means comprising an open end perforate rotatable drum extending transversely of said tower substantially the width thereof and having an extended shaft, and a trough-like injector of length comparable to the length of said drum slidably and rotatably carried by said shaft so as to slide into and out of said drum during rotation thereof.

LOUIS T. FREDERICK.